United States Patent
Cook et al.

(10) Patent No.: US 7,277,243 B2
(45) Date of Patent: Oct. 2, 2007

(54) LENS ASSEMBLY WITH INTEGRATED FEATURES

(75) Inventors: Gary Cook, Aloha, OR (US); Brian G. Heintz, Canby, OR (US)

(73) Assignee: InFocus Corporation, Wilsonville, OR (US)

( * ) Notice: Subject to any disclaimer, the term of this patent is extended or adjusted under 35 U.S.C. 154(b) by 228 days.

(21) Appl. No.: 10/900,640

(22) Filed: Jul. 27, 2004

(65) Prior Publication Data
US 2006/0023175 A1  Feb. 2, 2006

(51) Int. Cl.
*G02B 7/02* (2006.01)
(52) U.S. Cl. .................... 359/819; 359/811
(58) Field of Classification Search .............. 359/819, 359/811, 813, 818, 821, 822, 823, 824, 826
See application file for complete search history.

(56) References Cited

U.S. PATENT DOCUMENTS

| | | | | |
|---|---|---|---|---|
| 4,643,010 A | * | 2/1987 | Krivec et al. | 70/272 |
| 5,177,641 A | * | 1/1993 | Kobayashi et al. | 359/820 |
| 5,214,533 A | * | 5/1993 | Moracchini | 359/367 |
| 6,118,598 A | * | 9/2000 | Gardner, Jr. | 359/811 |
| 6,327,103 B1 | * | 12/2001 | Belliveau et al. | 359/819 |
| 2006/0061737 A1 | * | 3/2006 | Belliveau | 353/119 |

* cited by examiner

*Primary Examiner*—Timothy Thompson
(74) *Attorney, Agent, or Firm*—Schwabe Williamson & Wyatt

(57) ABSTRACT

An apparatus, method, and system for a lens assembly including a first and second element adapted to be engaged with one another in a manner to secure a first and second lens therebetween is disclosed herein.

30 Claims, 3 Drawing Sheets

LENS ASSEMBLY WITH INTEGRATED FEATURES

FIELD

Disclosed embodiments of the present invention relate to the field of projection systems, and more particularly to an assembly for positioning and securing optical lenses within projection systems.

BACKGROUND

Projection systems employ a complex framework of optical elements aligned together to provide an efficient light path from an illumination module through light modulation elements and out through a projection lens. Lens assemblies are used to facilitate the alignment of various lenses with one another and other optical elements in order to satisfy the performance criteria of a particular projection system.

Mass scale production of lens assemblies exploit the smallest of inefficiencies and sacrifice profit margins with every extraneous manufacturing process. Prior art lens assemblies have multiple discrete components including a tube, spacers, lens retainers, locating pins, etc., that may each require several process steps including, for example, turning, milling, drilling, and tapping. Therefore, it is difficult for these prior art lens assemblies to capitalize on economies of scale, while providing a lens assembly suitable to satisfy demanding performance criteria.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

A method, apparatus, and system for a lens assembly having integrated features are disclosed herein. In the following detailed description, reference is made to the accompanying drawings that form a part hereof, wherein like numerals designate like parts throughout. The drawings may show, by way of illustration, specific embodiments in which the invention may be practiced. It is to be understood that other embodiments may be utilized and structural or logical changes may be made without departing from the scope of the embodiments of the present invention. It should also be noted that directions and/or references (e.g., up, down, top, and bottom) may be used in the discussion of the drawings. These are used to facilitate the discussion of the drawings and are not intended to restrict the application of the embodiments of this invention. Therefore, the following detailed description is not to be taken in a limiting sense and the scope of the embodiments of the present invention are defined by the appended claims and their equivalents.

Figure 1A:
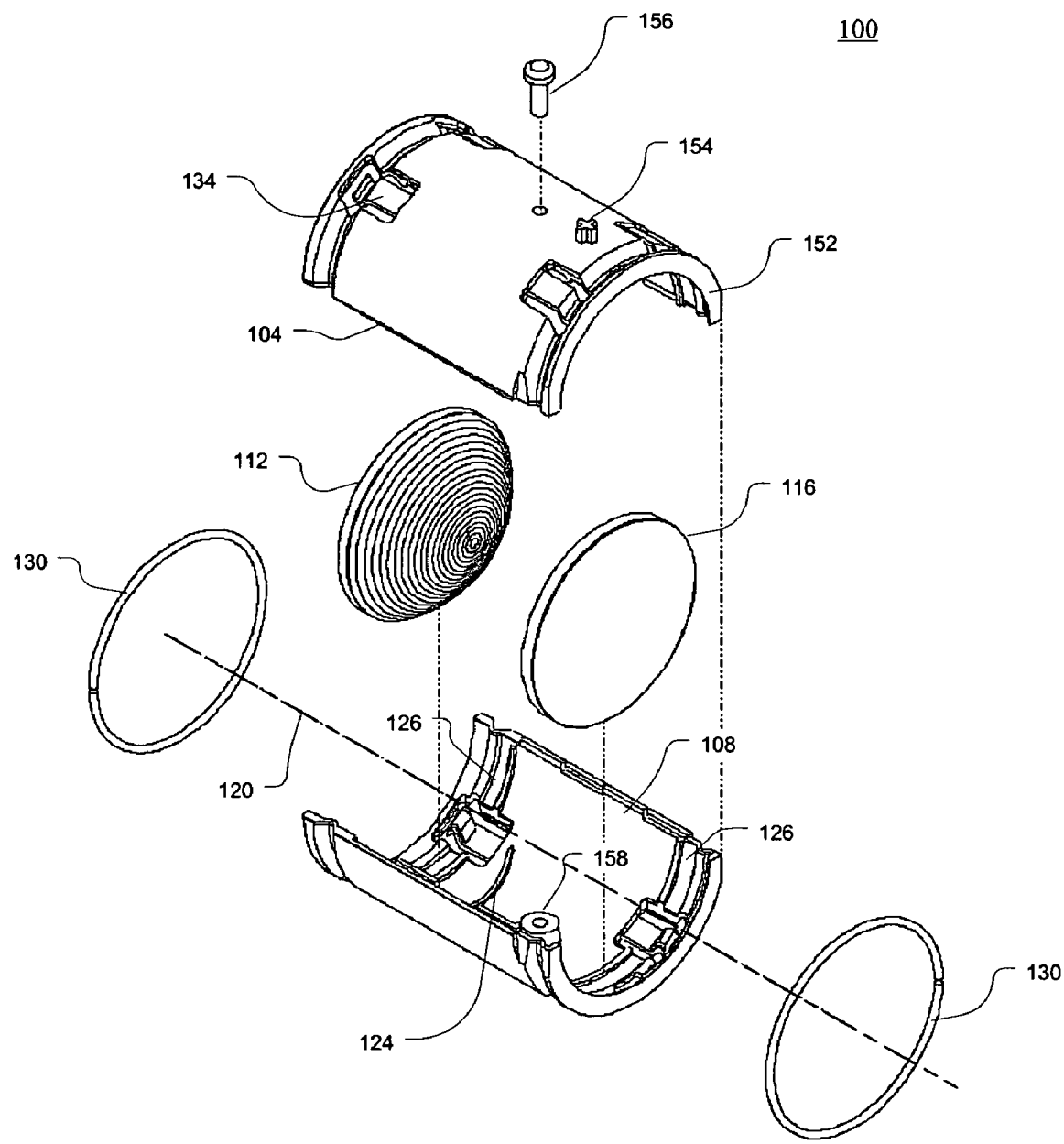
FIGS. 1a-1b illustrate an exploded and combined view of a lens assembly with integrated features, in accordance with one embodiment of the present invention.
Figure 1B:
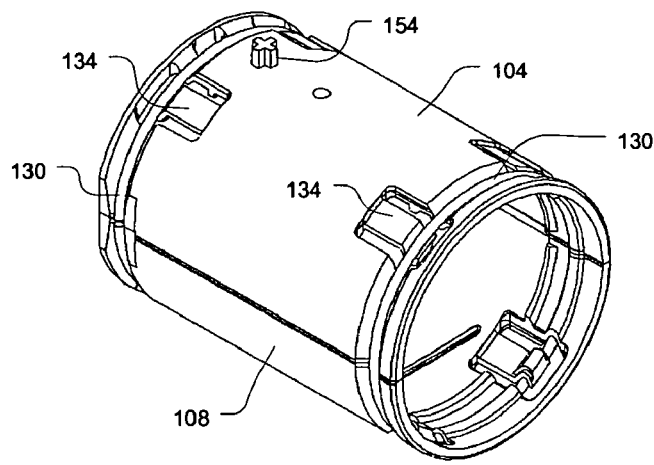

FIGS. 1a-1b respectively illustrate an exploded and combined view of a lens assembly 100 having integrated features, in accordance with an embodiment of the present invention. More particularly a first element 104 may be engaged to a second element 108 in a manner such that a first and second lens 112 and 116 are securely disposed in between (lenses not shown in FIG. 1b). The lenses 112 and 116 may be held a predetermined distance from one another according to the optical properties of the lenses 112 and 116 and the objective of the lens assembly 100. The lenses 112 and 116 may be disposed on a common optical axis 120.

In various embodiments, the first and second elements 104 and 108 may include a number of integrated features designed for a variety of purposes including, but not limited to, positioning the lens assembly 100, securing the lenses 112 and 116 within the lens assembly 100, securing the lens assembly 100 to a projector system chassis, and shaping an illumination bundle passing through the lens assembly 100. The integration of one or more of these features into the elements 104 and 108 may serve to streamline manufacturing processes while reducing costs as compared to prior art lens assemblies.

In one embodiment, the first and second elements 104 and 108 may be formed of a plastic material that may facilitate the integration of certain features. Molten plastic may be injected into a mold in order to form the elements 104 and 108. In one embodiment the plastic material may be high-temperature plastic material so that the lens assembly 100 may resist outgassing at temperatures within the operating range of a projection device within which the lens assembly 100 is employed. In other embodiments the elements 104 and 108 may be made of a metal, e.g., aluminum.

In one embodiment element 104 may be identical to element 108. In this embodiment, the production of both of the elements 104 and 108 may occur on the same manufacturing line, which may further reduce expenses associated with producing the lens assembly 100. Having identical elements 104 and 108 may also facilitate the assembly and/or installation of the lens assembly 100 by providing a symmetrical unit.

In one embodiment the elements 104 and 108 may include a visual assembly aid 124 molded on an inner surface to facilitate the placement of the lenses 112 and 116. The lenses 112 and 116 may be different from one another and asymmetrical relative to a vertical plane. Therefore, the visual assembly aid 124 may serve as a reference for an operator to identify the correct orientation and/or selection of the lenses 112 and 116 during assembly.

In one embodiment, the elements 104 and 108 may include a lens seat 126 for each of the lenses 112 and 116. The lens seats 126 may include a pair of ridges, between which, the periphery of the lenses 112 and 116 may be disposed. The lens seats 126 may obstruct axial motion, relative to the common optical axis 120, of the lenses 112 and 116.

In one embodiment, the elements 104 and 108 may be held together by one or more retaining rings 130 placed over the ends. The retaining rings 130 may exert a center-seeking, or radial, force on the elements 104 and 108. This radial force may facilitate the engagement of the two elements 104 and 108. The outer surface of the elements 104 and 108 may include a groove in which the retaining rings 130 are positioned to prevent slipping. In one embodiment, the retaining rings 130 may be substantially circular, as shown. In various embodiments, these retaining rings 130 may be made of material such as, but not limited to, wire (e.g., stainless steel), rubber, plastic, etc.

In other embodiments, the elements 104 and 108 may be held together by a wide variety of connecting components other than retaining rings. For example, these connecting components, which may or may not be integrated into the elements 104 and 108, may include hooks, snaps, clips, etc.

Figure 2:
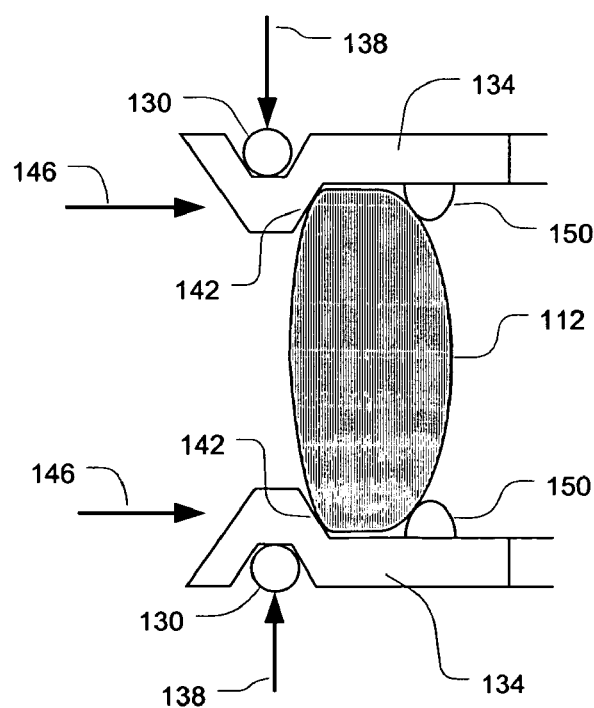
FIG. 2 illustrates a pair of lens retainers of a lens assembly, in accordance with an embodiment of the present invention.

Elements 104 and 108 may include one or more integrated lens retainers 134, in accordance with one embodiment. FIG. 2 illustrates a cross-sectional view of lens retainers 134 securing lens 112. The lens retainers 134 may act as a cantilevered spring to provide a radial force 138. The retaining ring 130 may augment this radial force 138. The lens retainers 134 may have a sloped face 142 that may additionally provide an axial force 146. This axial force 146 may press the lens 112 against the inner ridge 150 of the lens seat 126 thereby facilitating the securement of the lens 112. In another embodiment, the lens retainers 134 may provide an axial force asserted against an outer ridge of the lens seat 126. The integration of the lens retainers 134 into the elements 104 and 108 may eliminate the need for having discrete lens retainers that would require hard tooling, e.g., stamping, plating, etc.

In one embodiment, elements 104 and 108 may each include a shaped end to provide an illumination stop 152 when the elements 104 and 108 are combined. The illumination stop 152 may be used to shape the light as it is passed to downstream components, e.g., a light valve. In various embodiments, the illumination stop 152 may be molded into the upstream end as a front stop and/or into the downstream end as a rear stop. Similar to the integrated lens retainers 134 the integration of the illumination stop 152 may eliminate the need to have a discrete illumination stop that would require hard tooling.

In one embodiment, the elements 104 and 108 may include a locating pin 154 molded onto the external surface. The locating pin 154 may be used to assist the positioning of an assembled lens assembly 100 into a projection device chassis. The chassis may include a calibration slot that the locating pin 154 fits into. Calibration of the distances between the lens assembly 100 and other components, e.g., upstream light module and a downstream light valve, may be performed with the projection device on by moving the lens assembly 100 back and forth with the locating pin 154 in the calibration slot. When a desired position of the lens assembly 100 is determined it may be secured to the chassis with an attachment screw 156.

The attachment screw 156 may be received by a boss 158 that is molded into the inner surface on either element 104 or 108. The boss 158 may allow for the attachment screw 156 to be a self-threading screw, or self-tapping screw, which would, in turn, eliminate the need for tapping threads into a machined hole. The dimensions of the boss 158 may be determined by reference to the self-tapping screw manufacturer's recommendations.

Eliminating the necessity of certain discrete components may not only reduce manufacturing and tooling costs, but may also remove assembly steps associated with the discrete components.

Figure 3:
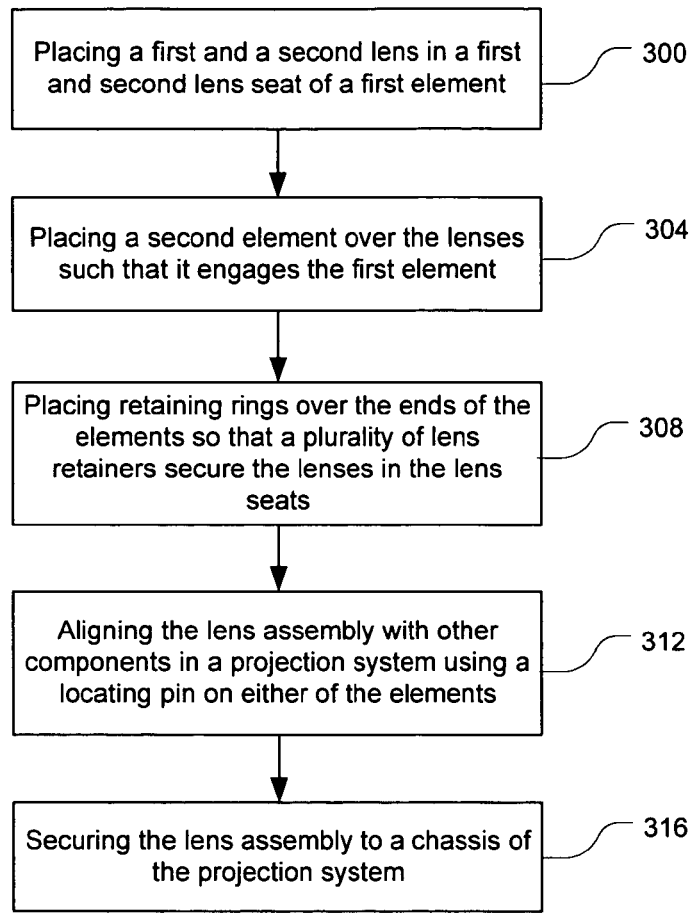
FIG. 3 illustrates a method of assembling a lens assembly, in accordance with an embodiment of the present invention.

FIG. 3 shows a methodology of assembling a lens assembly, in accordance with an embodiment of the present invention. Lenses may be placed in lens seats of a first element 300, which may be designed to complement a portion of the periphery of the lenses. The placement of the lenses may be facilitated by a visual assembly aid that may be molded onto an inner surface of the element. A second element may be placed over the lenses so that it engages with the first element 304. The second element may have lens seats complementing the remaining portion of the periphery of the lenses. Retaining rings may be placed over the ends of the first and second elements 308. These retaining rings may cause lens retainers to further secure the lenses in the lens seats as well as holding the first and second elements together. In one embodiment, securing the lenses into the lens assembly may be accomplished by hand without the need for special tools such as pliers and screwdrivers that are needed for prior art lens assemblies.

The assembled lens assembly may be placed into a chassis of a projection device such that a locating pin on either of the elements is received in a calibration slot of the chassis. The lens assembly may be calibrated with the other components of the projection device by moving the lens assembly back and forth with the locating pin in the calibration slot 312. When the positioning of the lens assembly is sufficiently calibrated it may be secured to the chassis 316.

Figure 4:
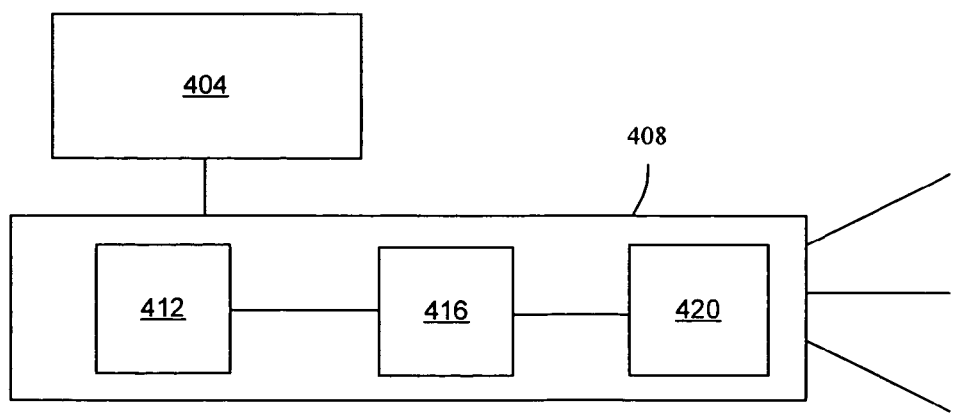
FIG. 4 illustrates a system incorporating a lens assembly, in accordance with an embodiment of the present invention.

FIG. 4 is a simplified pictorial plan view of a system including a video unit 404 coupled to a projection device 408, in accordance with an embodiment of the present invention. In this embodiment the video unit 404 may transmit video signals to the projection device 408, which may include an illumination module 412 optically coupled to image projection optics 420 through a lens assembly 416. The components of the projection device 408 may cooperate with one another to jointly effectuate rendering of desired images, which may be image frames of a video, based on the transmitted video signals.

In one embodiment the illumination module 412 may provide an illumination bundle to the lens assembly 416, which may be similar to the lens assembly 100 discussed with reference to the above embodiments. The lens assembly 416 may assist in relaying the illumination bundle from the illumination module 412 to the image projection optics 420 by housing one or more relay lenses along a common optical axis. The image projection optics 420 may receive the illumination bundle, modulate the illumination bundle to form image bearing light with an image-forming device, and project an image through a projection lens.

The illumination module 412 may include, but is not limited to, a high-energy discharge lamp, a light emitting diode, and a laser diode. The image projection optics 420 may include a digitally driven image-forming device (which may also be referred to as a light valve) such as, but not limited to, a liquid crystal display, liquid crystal on silicon, and a digital micromirror device.

The video unit 404 may include a personal or laptop computer, DVD, set-top box (STB), video camera, video recorder, an integrated television tuner, or any other suitable device to transmit video signals to the projection device 408. In various embodiments, the system may be, for example, a projector or a projection television.

Specific embodiments have been illustrated and described herein for purposes of description. However, a wide variety of alternate and/or equivalent implementations calculated to achieve the same purposes may be substituted for the embodiments shown and described without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus comprising:
a first element, having an inner surface adapted to complement a first shape of a first portion of a periphery of each of a first and a second lens;
a second element, having an inner surface adapted to complement a second shape of a second portion of the periphery of each of the first and second lenses, and the first and second elements are adapted to engage each other in a manner to secure the first and second lenses between the first and second elements; and
at least one flexible O-ring adapted to facilitate the first element engaging with the second element.

2. The apparatus of claim 1, wherein the first and second elements are adapted to secure the first and second lenses on a common axis.

3. The apparatus of claim 1, wherein the first and second elements are adapted to secure the first and second lenses at a predetermined distance from one another.

4. The apparatus of claim 1, wherein at least the first or the second element includes at least one first lens retainer adapted to at least facilitate the securement of the first lens.

5. The apparatus of claim 4, wherein the at least one first lens retainer is adapted to at least facilitate the securement of the first lens by being adapted to provide at least a radial or an axial force upon the first lens.

6. The apparatus of claim 5, wherein the at least one first lens retainer is adapted to provide an axial force upon the first lens and the inner surface of either the first or second element includes a lens seat having a first portion upon which the axial force is to secure the first lens against.

7. The apparatus of claim 4, wherein the at least one first lens retainer is molded into the first element.

8. The apparatus of claim 6, wherein each of the first and second elements further comprise:
a first end adapted to provide an illumination stop when the first and second elements are engaged with one another.

9. The apparatus of claim 6, wherein the first and second elements are substantially symmetrical to one another.

10. The apparatus of claim 6, wherein the first element is substantially identical to the second element.

11. The apparatus of claim 6, wherein the first element further comprises:
a visual assembly aid on the inner surface, adapted to at least facilitate placement of at least the first or second lens in the first element.

12. A system comprising:
an illumination module;
a lens assembly including:
a first element, having an inner surface adapted to complement a first shape of a first portion of a periphery of each of a first and a second lens;
a second element, having an inner surface adapted to complement a second shape of a second portion of the periphery of each of the first and second lenses, the first and second elements further adapted to engage each other in a manner to secure the first and second lenses between the first and second elements; and
a retaining ring placed on an outer surface of the first and second elements to assist in engaging the first and second elements with one another; and
a light valve, optically coupled to the illumination module through the lens assembly.

13. The system of claim 2, wherein the first and second elements include a plurality of lens retainers adapted to at least facilitate the securement of the first lens and second lenses.

14. The system of claim 13, wherein the first and second elements are substantially identical.

15. The system of claim 13, further comprising:
a video unit with an output video signal; and
a projection device, coupled to video unit, to receive video signal and project video, said projection device including the illumination module, the lens assembly, and the light valve.

16. The system of claim 15, wherein the projection device further comprises:
a chassis coupled to the illumination module, lens assembly, and the light valve; and
at least the first or the second element including a boss molded onto an inner surface of the first or the second element, adapted to receive an attachment screw used to couple the lens assembly to the chassis.

17. The system of claim 16, wherein at least the first or the second element includes a locating pin molded onto an outer surface, said locating pin adapted to facilitate a calibration of the lens assembly within the projection device.

18. The system of claim 15, in which the video unit is a selected one of a digital versatile disk (DVD), a video camera, an integrated television tuner, and a set-top box.

19. The system of claim 13, in which the second element has a first and a second lens retainer and the securement of the first and second lenses between the first and second elements is based at least in part on contact between the first lens retainer and the first lens and contact between the second lens retainer and the second lens.

20. The system of claim 19, wherein the first element further includes a third and a fourth lens retainer; and said securement is based at least in part on contact between the third lens retainer and the first lens and contact between the fourth lens retainer and the second lens.

21. An apparatus comprising:
a first element having a first flexible lens retainer;
a second element adapted to engage the first element in a manner to secure a first lens and a second lens between the first and the second elements, said securement of the first lens based at least in part on a contact force applied to the first lens by the first flexible lens retainer; and
a connecting component adapted to secure the first element to the second element and to engage the first flexible lens retainer to at least facilitate said contact force.

22. The apparatus of claim 21, wherein the first and second elements are adapted to secure the first and second lenses on a common axis.

23. The apparatus of claim 21, wherein the second element has a second flexible lens retainer and the securement of the first lens is based at least in part on a contact force applied to the first lens by the second flexible lens retainer.

24. The apparatus of claim 21, wherein said contact force comprises at least a radial or an axial force.

25. The apparatus of claim 21, wherein the connecting component comprises a retaining ring, a hook, a snap, or a clip.

26. The apparatus of claim 21, wherein the at least one first flexible lens retainer is molded into the first element.

27. An apparatus comprising:
   an inner surface having a lens seat adapted to receive a lens; and
   an outer surface having a coupling feature, including a flexible lens retainer, adapted to receive a connecting component in a manner
   to secure said apparatus to another apparatus, and
   to provide a contact force by the flexible lens retainer upon the lens to secure the lens between said apparatus and the another apparatus.

28. The apparatus of claim 27, wherein the apparatus is adapted to be secured to the another apparatus, which is substantially identical to the apparatus.

29. The apparatus of claim 27, wherein the connecting component comprises a retaining ring, a hook, a snap, or a clip.

30. The apparatus of claim 27, wherein the outer surface further comprises a locating pin adapted to facilitate calibration of said apparatus within a projection device.

* * * * *